United States Patent
Riedy et al.

(10) Patent No.: US 6,450,353 B1
(45) Date of Patent: Sep. 17, 2002

(54) FLOOR BOX COVER ASSEMBLY

(75) Inventors: Charles H. Riedy, Lakewood; Gregory D. Turcovsky, Mentor, both of OH (US)

(73) Assignee: The Lamson & Sessions Co., Cleveland, OH (US)

( * ) Notice: Subject to any disclaimer, the term of this patent is extended or adjusted under 35 U.S.C. 154(b) by 0 days.

(21) Appl. No.: 09/406,557

(22) Filed: Sep. 27, 1999

(51) Int. Cl.$^7$ .................................................. H02G 3/08
(52) U.S. Cl. ........................ 220/3.3; 174/48; 220/3.5; 220/3.8
(58) Field of Search ........................... 220/3.3, 3.4, 3.5, 220/3.6, 3.7, 3.8; 174/48

(56) References Cited

U.S. PATENT DOCUMENTS

| | | | |
|---|---|---|---|
| 1,224,712 A | | 5/1917 | Clark |
| 1,268,904 A | | 6/1918 | White |
| 2,143,517 A | * | 1/1939 | Huff ............................ 220/3.5 |
| 2,480,578 A | | 8/1949 | Hodges |
| 2,913,136 A | | 11/1959 | Johnson |
| 3,318,476 A | * | 5/1967 | Clark ....................... 220/3.8 X |
| 3,369,691 A | * | 2/1968 | Wei |
| 3,381,845 A | | 5/1968 | MacDonald |
| 3,831,802 A | | 8/1974 | Chambers et al. |
| 3,956,573 A | * | 5/1976 | Meyers et al. ................. 174/48 |
| 4,044,908 A | | 8/1977 | Dauberger |
| 4,054,222 A | | 10/1977 | Suk |
| 4,305,180 A | | 12/1981 | Schwartz |
| 4,334,630 A | * | 6/1982 | Bergin ......................... 220/3.8 |
| 4,339,165 A | | 7/1982 | Malsot et al. |
| 4,468,078 A | | 8/1984 | Frear et al. |
| 4,478,473 A | | 10/1984 | Frear |
| 4,496,067 A | | 1/1985 | Benscoter |
| 4,874,139 A | * | 10/1989 | Kewin |
| 5,007,549 A | | 4/1991 | Suk |
| 5,529,202 A | | 6/1996 | Shamis |
| 5,589,665 A | | 12/1996 | Scamacca |
| 5,662,488 A | | 9/1997 | Alden |
| 5,714,963 A | | 2/1998 | Cox |

FOREIGN PATENT DOCUMENTS

| | | | | |
|---|---|---|---|---|
| GB | 2260452 | * | 4/1993 | ................. 220/3.6 |
| SE | 151436 | * | 9/1955 | ................. 220/3.3 |

* cited by examiner

Primary Examiner—Lee Young
Assistant Examiner—Joseph C. Merek
(74) Attorney, Agent, or Firm—Jones, Day, Reavis & Pogue

(57) ABSTRACT

A floor box cover assembly includes a ring receivable within an open end portion of the floor box, and further includes a cover structure having an access opening for providing access to the receptacle. A cylindrical wall on the cover structure fits within the ring when the cover structure is installed over the ring. The ring and the cover structure together define a plurality of radially projecting pins and a corresponding plurality of J-hook slots that receive the pins upon installation of the cover structure over the ring. The slots are free of detent constrictions for interlocking with the pins. Additionally, the ring is a split ring and fits within the floor box in an installed position in which opposite ends of the split ring define a circumferentially extending gap. The cover structure has an alignment boss that blocks insertion of the cylindrical wall into the split ring in positions other than a position in which the alignment boss is received within the gap.

18 Claims, 3 Drawing Sheets

FLOOR BOX COVER ASSEMBLY

BACKGROUND OF THE INVENTION

The present invention relates to cover assemblies for floor mounted electrical receptacles.

A floor mounted electrical receptacle is typically contained in a structure known as a floor box. Electrical power lines are routed upward to the receptacle through an open lower end of the floor box. A cover assembly at the floor surface conceals the floor box from view, and has a closure member that can be opened to provide access to the receptacle in the floor box.

SUMMARY OF THE INVENTION

The present invention is an apparatus for use with an electrical receptacle and a floor box. The apparatus includes a ring that is receivable within an open upper end portion of the floor box. The apparatus further includes a cover structure that has an access opening for providing access to the receptacle. A cylindrical wall on the cover structure fits within the ring when the cover structure is installed over the ring.

In accordance with a principal feature of the invention, the ring and the cover structure together define a plurality of radially projecting pins and a corresponding plurality of J-hook slots that receive the pins upon installation of the cover structure over the ring. The slots are free of detent constrictions for interlocking with the pins.

In accordance with another principal feature of the invention, the ring is a split ring that fits within the floor box in an installed position in which opposite ends of the split ring define a circumferentially extending gap. The cover structure has an alignment boss that blocks insertion of the cylindrical wall into the split ring in positions other than a position in which the alignment boss is received within the gap.

DESCRIPTION OF A PREFERRED EMBODIMENT

Figure 1:
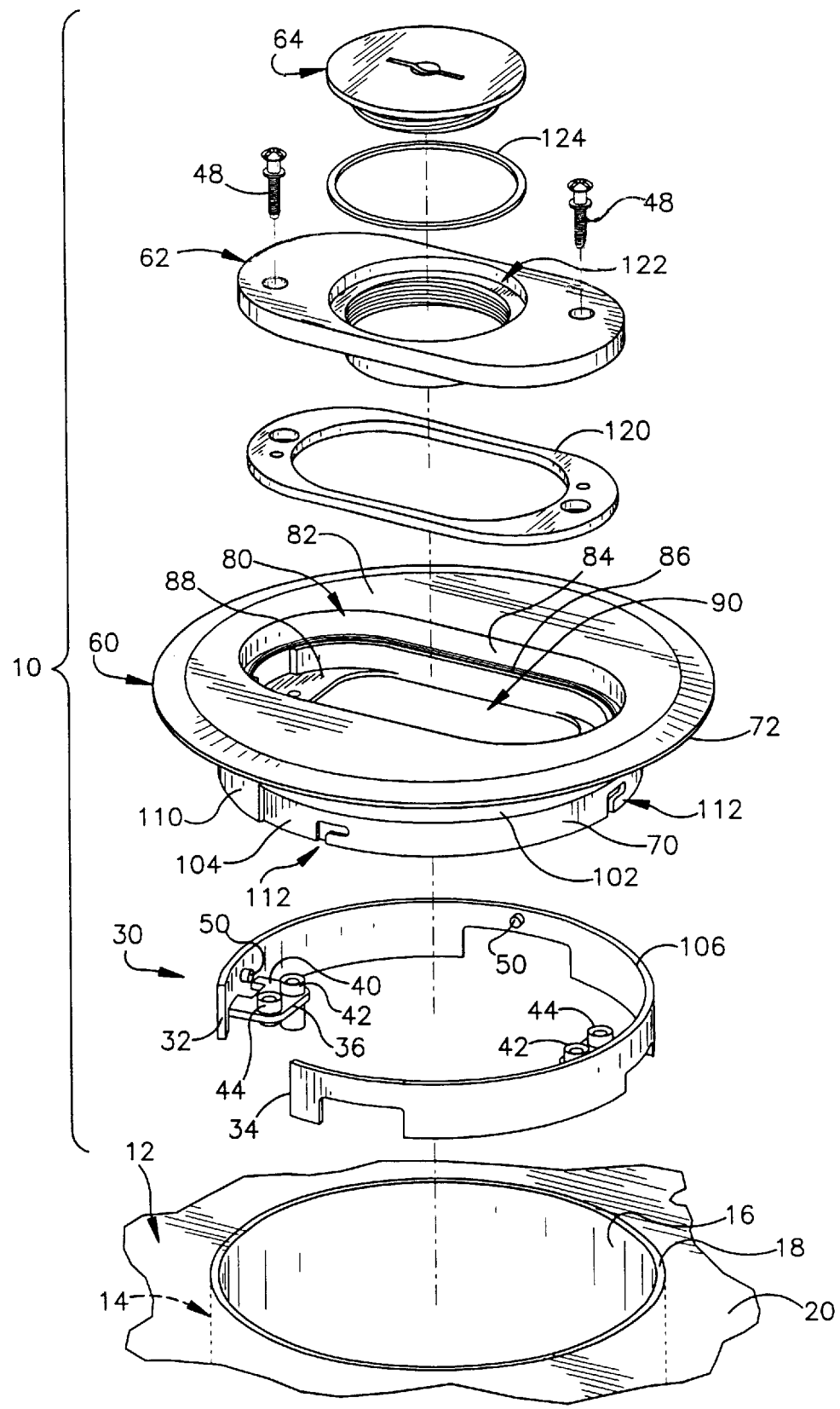
FIG. 1 is an exploded view of an apparatus comprising a preferred embodiment of the present invention.
Figure 2:
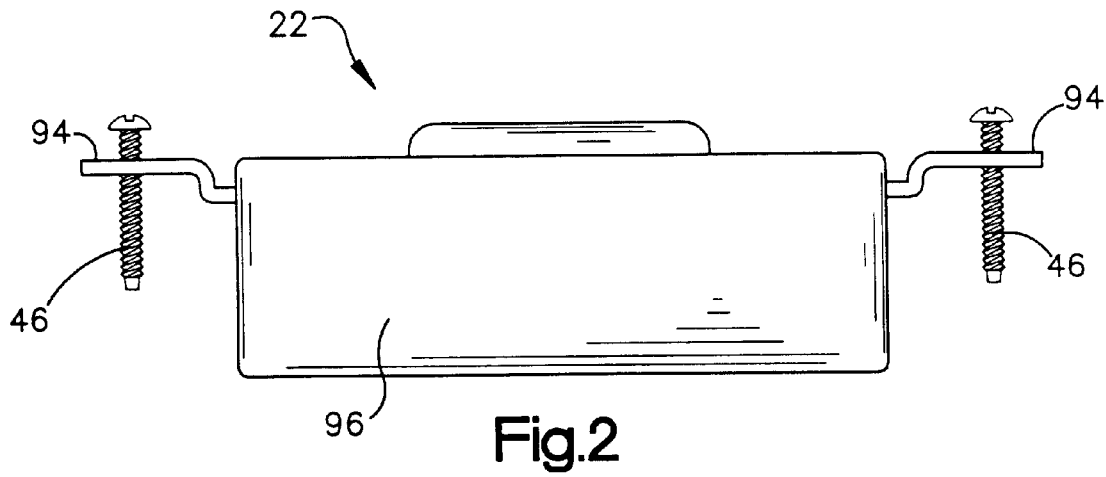
FIG. 2 is a side view of an electrical receptacle used with the apparatus of FIG. 1.

A preferred embodiment of the present invention is a cover assembly 10 which includes a plurality of parts that are shown separately in FIG. 1. Also shown in FIG. 1 is a concrete floor 12 and a cylindrical floor box 14 embedded in the floor 12. An open upper end portion 16 of the floor box 14 has an annular edge surface 18 substantially flush with the surrounding surface 20 of the floor 12. The cover assembly 10 is configured to support an electrical receptacle 22 (FIG. 2) at a level near the floor surface 20 when the cover assembly 10 is fully assembled and installed in the floor box 14.

The separate parts of the cover assembly 10 include a rocker ring 30. The rocker ring 30 is installed in the floor box 14 by the use of an adhesive after the other parts of the cover assembly 10 are interconnected with the rocker ring 30. In the preferred embodiment of the invention, the rocker ring 30 is a radially deflectable split ring with an original size that is slightly wider than the open upper end portion 16 of the floor box 14. This enables the rocker ring 30 to exert a radially outward spring force that helps to retain it loosely within the floor box 14 while the adhesive cures. When the rocker ring 30 has been installed in the floor box 14 in this manner, its opposite ends 32 and 34 are spaced apart from each other to define a circumferentially extending gap at the periphery of the rocker ring 30.

Figure 3:
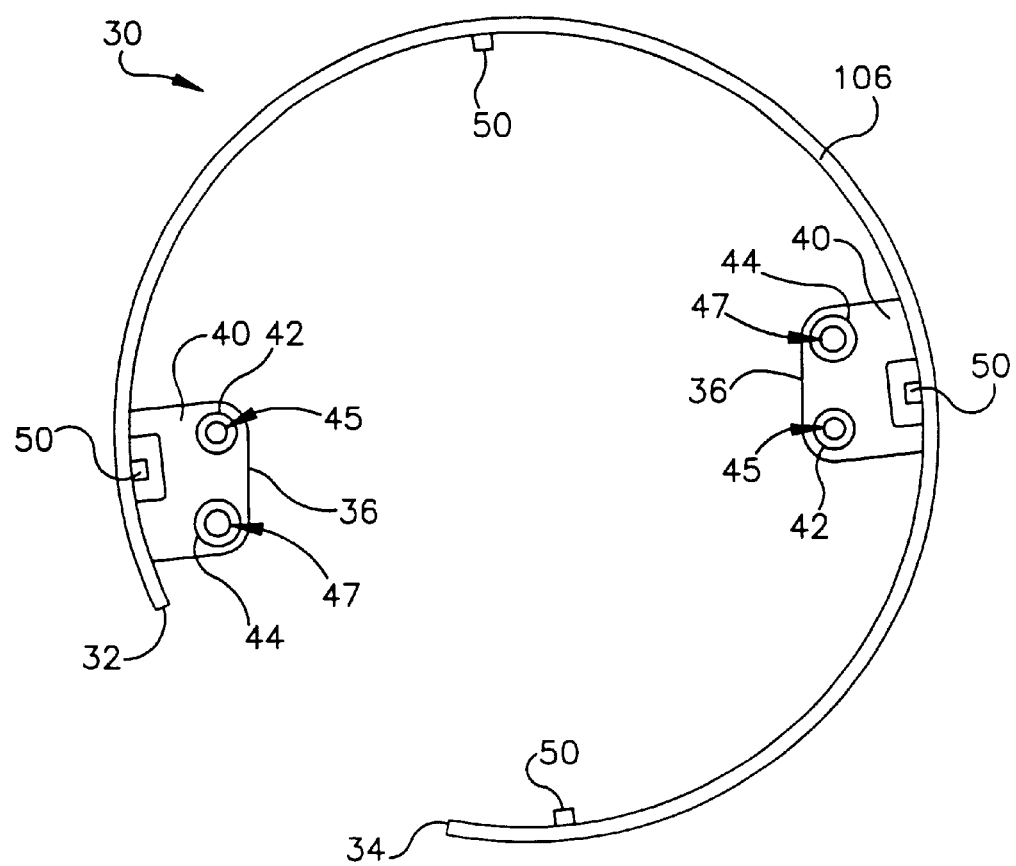
FIG. 3 is a top view of a part shown in FIG. 1.

The rocker ring 30 is preferably formed as a one-piece plastic part. By "one-piece" it is meant that the rocker ring 30 is a single unit exclusive of separate but joined elements. As shown in FIG. 3, the rocker ring 30 has a pair of mounting portions 36. The mounting portions 36 are alike, but project radially inward at diametrically opposite locations, and are thus oriented oppositely relative to each other. Each mounting portion 36 of the rocker ring 30 includes a platform 40 which supports first and second fastener guides 42 and 44. The first fastener guides 42 are elongated cylindrical structures with bores 45 for receiving fasteners 46 (FIG. 2) that project from the receptacle 22. The second fastener guides 44 are relatively short cylindrical structures with bores 47 for receiving the fasteners 48 that are shown in FIG. 1. Those fasteners 48 interconnect the rocker ring 30 with other parts of the cover assembly 10 in accordance with the present invention, as described more fully below. Four alignment pins 50 on the rocker ring 30 project radially inward at locations that are circumferentially spaced apart by 90 degrees. The alignment pins 50 also are used for interconnection of the rocker ring 30 with other parts of the cover assembly 10.

Referring again to FIG. 1, the cover assembly 10 in the preferred embodiment of the invention includes a cover structure having first, second and third parts 60, 62 and 64. Each of the three cover parts 60, 62 and 64 also is preferably formed as a one-piece plastic part. The first cover part 60 is a circular floor plate configured to receive and support the receptacle 22. When the receptacle has been received on the floor plate 60, the floor plate 60 and the receptacle 22 (FIG. 2) are together installed over the rocker ring 30. A cylindrical lower side wall 70 on the floor plate 60 fits within the rocker ring 30. A flange 72 on the floor plate 60 is configured to project radially outward beyond the upper edge surface 18 of the floor box 14 to partially overlie the surrounding floor surface 20.

Figure 4:
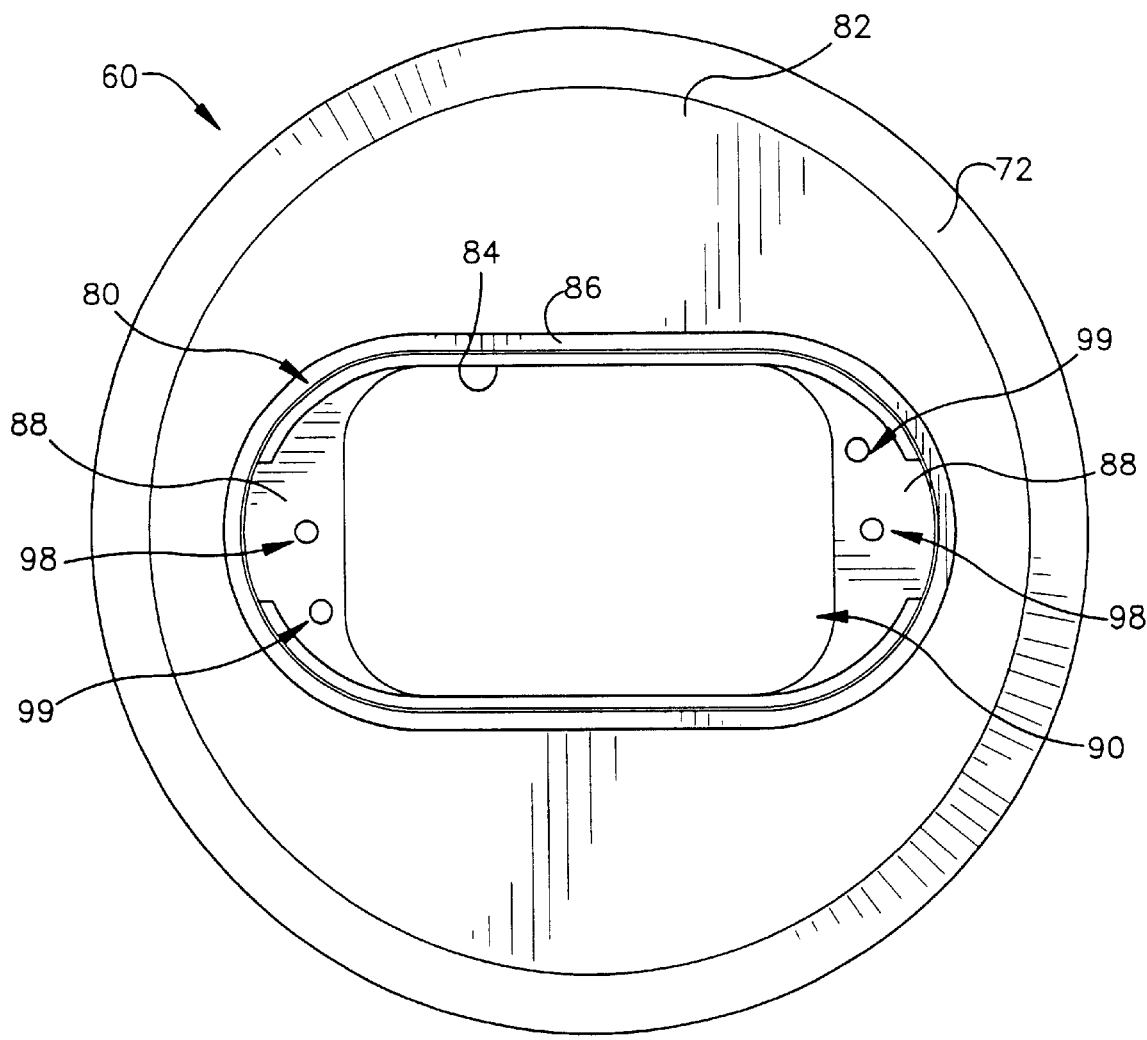
FIG. 4 is a top view of another part shown in FIG. 1.

The floor plate 60 defines a compartment 80 for receiving the receptacle 22. The compartment 80 is open at the upper surface 82 of the floor plate 60. An inner wall surface 84 of the floor plate 60 provides the compartment 80 with the generally rectangular peripheral shape that is rounded at its opposite ends. A shoulder portion 86 of the inner wall surface 84 defines a peripheral ledge within the compartment 80. A pair of diametrically opposed mounting surfaces 88 (FIG. 4) define the bottom of the compartment 80. A generally rectangular opening 90 extends across the bottom of the compartment 80 between the mounting surfaces 88.

The floor plate 60 is thus configured to receive and support the receptacle 22 (FIG. 2) in an installed position in which mounting tabs 94 on the receptacle 22 rest on the mounting surfaces 88 at the bottom of the compartment 80. A rectangular body portion 96 of the receptacle 22 projects downward through the opening 90 beneath the compartment 80. A pair of apertures 98 at the mounting surfaces 88 are arranged to receive the fasteners 46 at the opposite ends of the receptacle 22. Another pair of apertures 99 at the mounting surfaces 88 are arranged to receive the other fasteners 48 (FIG. 1).

Figure 5:
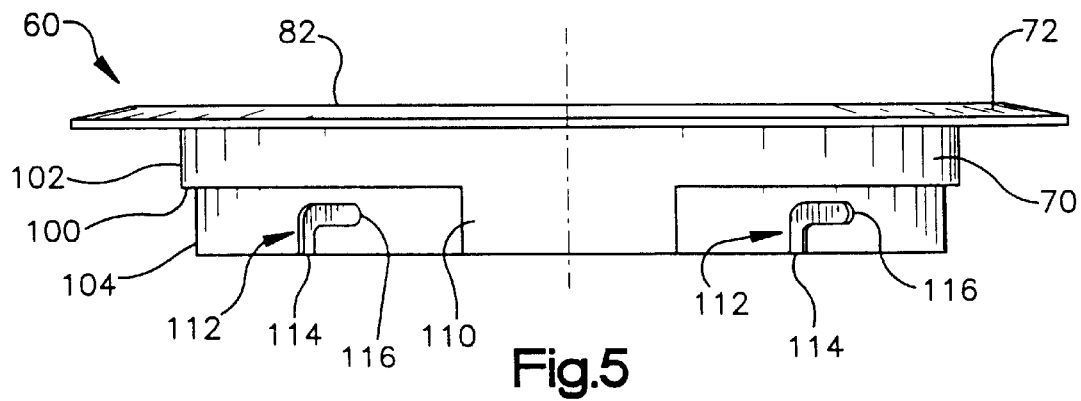
FIG. 5 is a side view of the part shown in FIG. 4.

As shown in FIG. 5, the floor plate 60 has an annular shoulder surface 100 separating upper and lower sections 102 and 104 of the cylindrical wall 70. The lower section 104 has an outer diameter equal to, or just slightly less than, the inner diameter of the rocker ring 30 when the rocker ring 30 is installed in the floor box 14 (FIG. 1). The lower section 104 of the cylindrical wall 70 is thus receivable closely within the rocker ring 30 upon installation of the floor plate 60 over the rocker ring 30. The shoulder surface 100 then rests on an annular upper edge surface 106 of the rocker ring 30 so that the upper section 102 of the cylindrical wall 70 projects upward from the rocker ring 30. This provides clearance for a carpet or other floor covering to fit between the floor surface 20 and the flange 72 on the floor plate 60.

An alignment boss 110 is located on the floor plate 60. In the preferred embodiment of the invention, the alignment boss 110 projects radially from the lower section 104 of the cylindrical wall 70. The circumferentially extending length of the alignment boss 110 is preferably somewhat less than that of the gap between the opposite ends 32 and 34 of the rocker ring 30. However, the alignment boss 110 has a cylindrical contour with a diameter equal to the diameter of the upper section 102 of the cylindrical wall 70. In this configuration, the alignment boss 110 is movable axially into the gap between the opposite ends 32 and 34 of the rocker ring 30, and blocks insertion of the cylindrical wall 70 into the rocker ring 30 in positions other than a position in which the alignment boss 110 is received within the gap. This ensures that the floor plate 60 will be circumferentially aligned with the rocker ring 30 such that the opposite ends of the receptacle compartment 80 will overlie the mounting structures 36 when the floor plate 60 is first placed over the rocker ring 30.

More precise alignment of the floor plate 60 with the rocker ring 30 is accomplished by the use of J-hook slots 112 on the floor plate 60. Specifically, four J-hook slots 112 (two of which are shown in FIG. 5) are formed in the lower section 104 of the cylindrical wall 70. Each slot 112 receives a corresponding alignment pin 50 (FIG. 3) through its open end 114 upon movement of the lower section 104 axially downward into the rocker ring 30. The slots 112 subsequently receive the alignment pins 50 at their inner ends 116 upon a small amount of rotation of the floor plate 60 relative to the rocker ring 30. The shorter length of the alignment boss 110 enables it to move circumferentially within the gap when the floor plate 60 is rotated in this manner. The apertures 98 and 99 on the floor plate 60 are simultaneously moved into alignment with the apertures 45 and 47 on the rocker ring 30. The fasteners 46 can then be advanced through the corresponding apertures 98 and 45 to fasten the receptacle 22 securely to both the floor plate 60 and the rocker ring 30. The other fasteners 48 can be received and advanced through their corresponding apertures 99 and 47 to fasten the floor plate 60 securely to the rocker ring 30. In accordance with a particular feature of the invention, the J-hook slots 112 are free of detent constrictions for interlocking with the alignment pins 50. Detents can be omitted in accordance with the invention because the fasteners 46 and 48 hold the floor plate 60 securely in its installed position over the rocker ring 30.

The second cover part 62 is a lid receivable over the receptacle 22 at the top of the compartment 80 in the floor plate 60. The lid 62 fits closely within the compartment 80, and rests on a lid gasket 120 which, in turn, rests on the ledge 86. An access opening 122 at the center of the lid 62 provides access to the receptacle 22. The third cover part 64, which is configured as a screw-threaded plug, cooperates with a plug gasket 124 to close the access opening 122.

The invention has been described with reference to a preferred embodiment. Those skilled in the art will perceive improvements, changes and modifications. Such improvements, changes and modifications are intended to be within the scope of the claims.

We claim:

1. An apparatus for use with an electrical receptacle, said apparatus comprising:

a cylindrical floor box having an open upper end portion;

a radially deflectable circular split ring receivable within said open upper end portion of said floor box, said split ring having an original size that is wider than said open upper end portion of said floor box so as to exert a radially outward spring force within said floor box; and a cover structure having a receptacle opening extending fully through said cover structure, said cover structure further having mounting portions configured to receive and support corresponding mounting portions of the receptacle upon installation of the receptacle in said receptacle opening, with said cover structure being configured for installation over said ring and having a cylindrical wall that fits within said ring when said cover structure is installed over said ring;

said ring and said cover structure together defining a plurality of radially projecting pins and a corresponding plurality of J-hook slots configured to receive said pins upon installation of said cover structure over said ring, said slots being free of detent constrictions for interlocking with said pins.

2. An apparatus as defined in claim 1 wherein said pins are defined by said ring and said slots are defined by said cover structure.

3. An apparatus as defined in claim 1 wherein said ring and said cover structure have apertures arranged to receive fasteners that engage and interconnect said ring and said cover structure.

4. An apparatus as defined in claim 1 wherein said ring and said cover structure have apertures arranged to receive fasteners that engage and interconnect the receptacle, said ring and said cover structure.

5. An apparatus as defined in claim 1 wherein said cover structure includes a floor plate which includes said cylindrical wall, and said floor plate has a peripheral flange configured to project transversely beyond said open upper end portion of said floor box when said floor plate is installed over said ring.

6. An apparatus as defined in claim 5 wherein said cover structure includes a lid which is separate from said floor plate and which defines an access opening through which the installed receptacle is accessible from above.

7. An apparatus as defined in claim 6 wherein said cover structure further includes a closure member which is separate from said lid and said floor plate and which is configured to close said access opening in said lid.

8. An apparatus as defined in claim 1 wherein opposite ends of said split ring define a circumferentially extending gap, and said cover structure further has an alignment boss configured to block insertion of said cylindrical wall into said split ring in positions other than a position in which said alignment boss is received within said gap.

9. An apparatus as defined in claim 8 wherein said alignment boss projects radially outward from said cylindrical wall.

10. An apparatus for us with an electrical receptacle, said apparatus comprising:

a cylindrical floor box having an open upper end portion;

a radially deflectable circular split ring receivable within said open upper end portion of said floor box in an installed position in which opposite ends of said split ring define a circumferentially extending gap, said split ring having an original size that is wider than said open upper end portion of said floor box so as to exert a radially outward spring force when in said installed position; and a cover structure having mounting portions configured to receive and support corresponding mounting portions of the electrical receptacle upon installation of the receptacle on said cover structure, said cover structure being configured for installation over said ring and having a cylindrical wall that fits within said ring when said cover structure is installed over said ring; said cover structure further having an alignment boss configured to block insertion of said cylindrical wall into said split ring in positions other than a position in which said alignment boss is received within said gap.

11. An apparatus as defined in claim 10 wherein said mounting boss projects radially outward from said cylindrical wall.

12. Apparatus as defined in claim 10 wherein said split ring and said cover structure together define a plurality of radially projecting pins and a corresponding plurality of J-hook slots configured to receive said pins upon installation of said cover structure over said split ring, said slots being free of detent constrictions for interlocking with said pins.

13. An apparatus as defined in claim 12 wherein said split ring and said cover structure have apertures arranged to receive fasteners that engage and interconnect said split ring and said cover structure upon installation of said cover structure over said split ring.

14. Apparatus as defined in claim 13 wherein all of said pins are defined by said split ring and all of said slots are defined by said cover structure.

15. Apparatus as defined in claim 10 wherein said ring and said cover structure have apertures arranged to receive fasteners that engage and interconnect the receptacle, said split ring, and said cover structure.

16. Apparatus as defined in claim 10 wherein said cover structure includes a floor plate which includes said cylindrical wall, and said floor plate has a peripheral flange configured to project transversely beyond said open upper end portion of said floor box to partially overlie the surrounding floor surface when said floor plate is installed over said split ring.

17. Apparatus as defined in claim 16 wherein said cover structure includes a lid which defines said access opening.

18. Apparatus as defined in claim 17 wherein said cover structure includes a closure member configured to close said access opening.

* * * * *

UNITED STATES PATENT AND TRADEMARK OFFICE
CERTIFICATE OF CORRECTION

PATENT NO. : 6,450,353 B1
DATED : September 17, 2002
INVENTOR(S) : Riedy et al.

It is certified that error appears in the above-identified patent and that said Letters Patent is hereby corrected as shown below:

Column 4,
Line 64, change "us" to -- use --.

Signed and Sealed this

Twenty-eighth Day of January, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,450,353 B1
DATED : September 17, 2002
INVENTOR(S) : Riedy et al.

It is certified that error appears in the above-identified patent and that said Letters Patent is hereby corrected as shown below:

Column 5,
Line 19, delete "mounting" and insert -- alignment --.

Signed and Sealed this

Eighteenth Day of May, 2004

JON W. DUDAS
*Acting Director of the United States Patent and Trademark Office*